United States Patent [19]
Smith

[11] 4,138,337
[45] Feb. 6, 1979

[54] FILTER CARTRIDGE

[76] Inventor: Robert G. Smith, 1211 Hidden Oak Rd., Chesterfield, Mo. 63017

[21] Appl. No.: 852,397

[22] Filed: Nov. 17, 1977

[51] Int. Cl.² ............... B01D 27/02; B01D 27/08
[52] U.S. Cl. ............... 210/238; 210/282; 210/315; 210/493 B
[58] Field of Search ............... 210/232, 237, 238, 282, 210/314, 315, 317, 457, 458, 493 A, 493 B

[56] References Cited
U.S. PATENT DOCUMENTS

| | | | |
|---|---|---|---|
| 3,042,571 | 7/1962 | Jackson | 210/493 B |
| 3,062,377 | 11/1962 | Howard et al. | 210/232 X |
| 3,348,689 | 10/1967 | Kraissl, Jr. | 210/238 |
| 3,487,940 | 1/1970 | Morris | 210/315 X |
| 3,733,267 | 5/1973 | Haase | 210/282 X |
| 3,970,563 | 7/1976 | Codo | 210/237 |

Primary Examiner—William A. Cuchlinski, Jr.
Attorney, Agent, or Firm—Richard J. Sher

[57] ABSTRACT

A filter cartridge utilized in filtering dry cleaning fluid includes an annular, generally cylindrical outer member which carries a tubular, pleated paper filter and an annular, generally cylindrical inner member which carries a particulate sorbant mass therewithin. In conventional use, dry cleaning fluid is caused to flow radially inwardly through the filter cartridge, first passing through the pleated paper filter and then through the sorbant mass. The fluid exits through a longitudinal passageway extending axially through the cartridge. After the filter cartridge has been spent, the inner member may be slidably removed from the outer member in order that the considerable weight of the spent cartridge may be removed from the filter tank in two separate operations.

4 Claims, 6 Drawing Figures

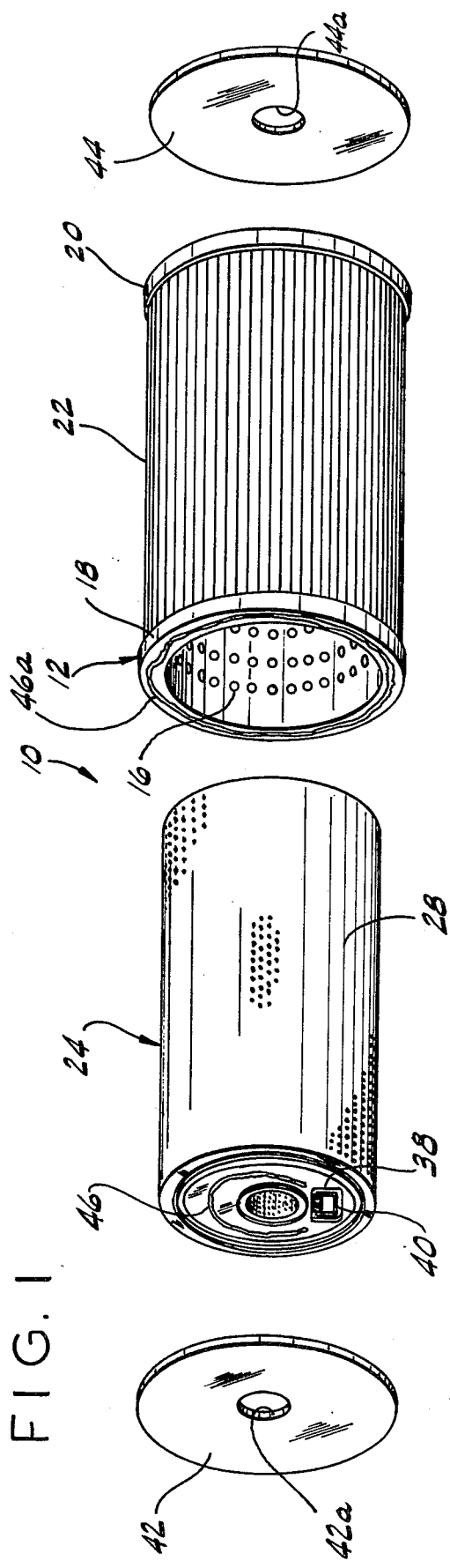
FIG. 1
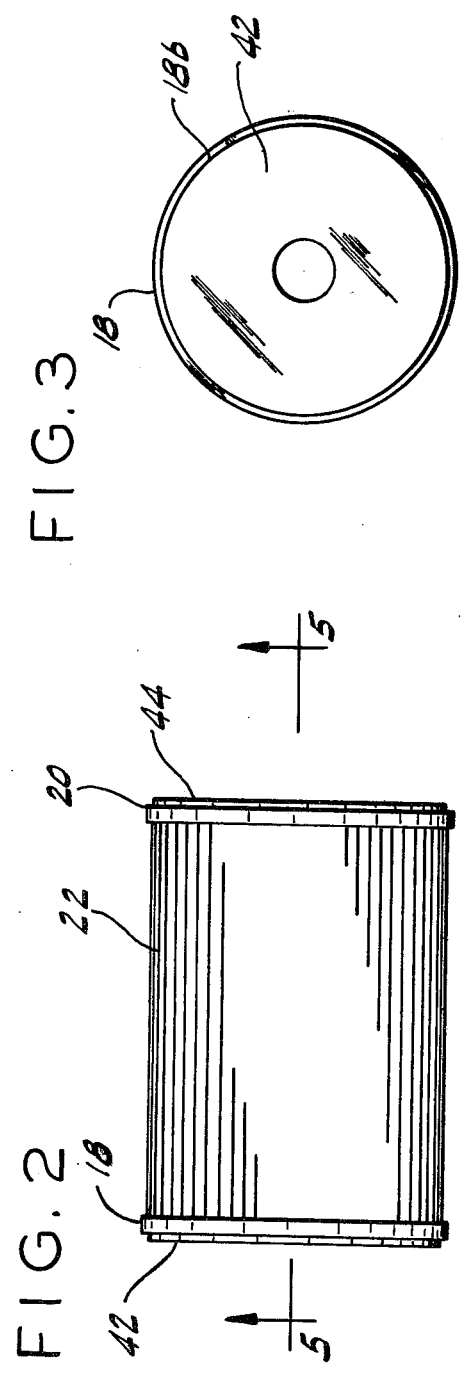
FIG. 3
FIG. 2

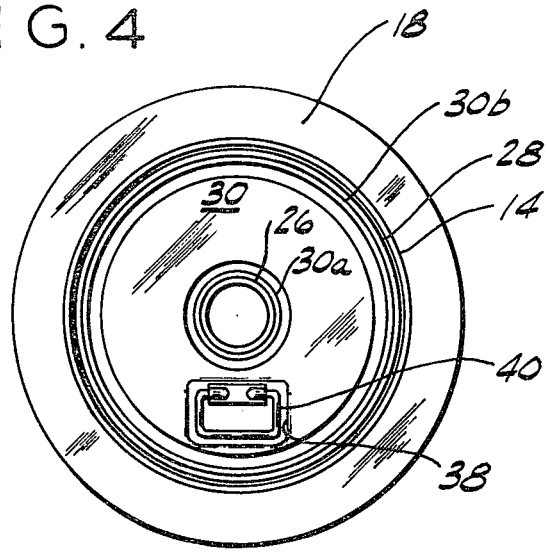
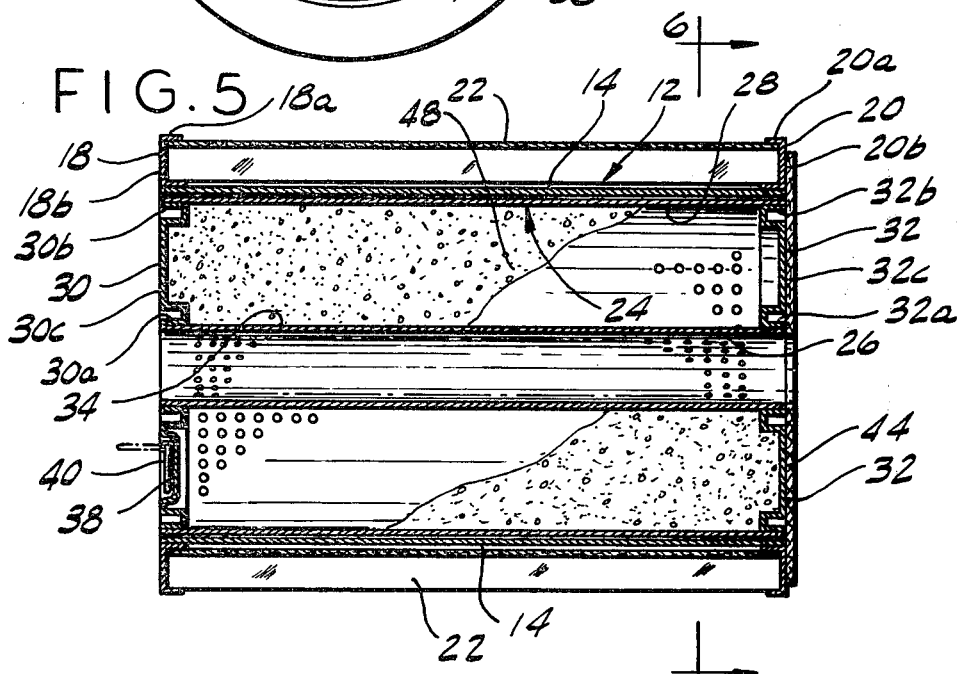
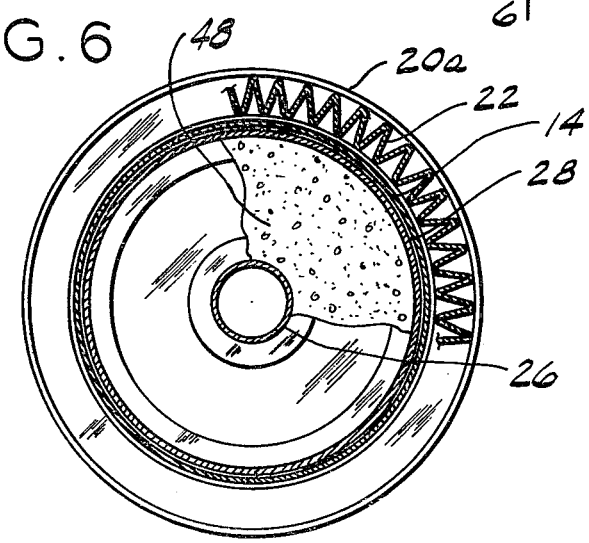

FILTER CARTRIDGE

BACKGROUND AND SUMMARY OF THE INVENTION

Dry cleaning establishments utilize various non-aqueous solvents such as perchlorethylene to clean clothes. When cleaning clothes, the dry cleaning solvent may remove fatty acids, soils, dyes, ets., and in order that the relatively expensive solvent may be reutilized it is necessary that these contaminants be effectively removed from the solvent. In recent years, a process is being used in a growing number of drycleaning establishments wherein the solvent is continually passed through filtering tanks containing filter cartridges capable of removing the solvent contaminants. This process is essentially described in U.S. Pat. No. 3,733,267 issued May 15, 1973 to Haase, the disclosure of which patent is herein incorporated and made a part hereof by reference thereto.

The vast majority of dry cleaning filter systems in use today comprise a plurality of vertically-stacked, horizontally disposed, elongated, generally-cylindrical filtering tanks, each tank containing therewithin a plurality of cylindrical filter cartridges placed in end to end abutment within each of the tanks. An annular felt sealing disc is placed between adjacent cartridge end faces to prevent fluid from bypassing the filters. Contaminated drycleaning solvent is pumped into a tank at a peripheral location so that the fluid enters the tank into an annular chamber defined by the exterior of the filter cartridges and the interior of the tank. An exit passageway conducts the fluid from the tank at a central position on a tank end cap so that exiting fluid is withdrawn from the tank through a longitudinally central bore constituted by the central bores of the filters placed end to end. Therefore, the fluid is caused to flow radially through the filters from the exterior thereof to the interior longitudinal bore of each filter.

As shown in the above-mentioned Haase patent, each filter cartridge comprises an annular, generally-cylindrical, sorbant mass usually including attapulgite clay particles mixed with particles of carbon. The sorbant mass is contained between two coaxial perforated sheet metal cylinders enclosed by metal end caps. Placed around the exterior of the outer perforated cylinder is a pleated filtering paper. Pursuant to the above description, drycleaning fluid is caused to first flow through the pleated filtering paper to remove the particulate fibrous contaminants in the solvent and then the fluid passes through the sorbant mass, which is able to remove fatty acids, water soluble soils, water insoluble soils, dyes, and excess water, and which provides deoderization of the solvent, all as disclosed in the Haase patent.

Typically, each of the filter cartridges is approximately one and a half feet long and one foot in diameter. After prolonged use, the paper filter becomes clogged and caked with particulate and fibrous matter and the absorbing qualities of the sorbant mass deteriorate. It is at this time, when the filter cartridge is spent, that the drycleaning establishment operator must remove the filter cartridges from the filter tanks and replace them with fresh ones. Due to the size of each filter cartridge, a single cartridge, when soaked with drycleaning solvent and laden with caked-on particulate and fibrous material, may weigh in the order of 90 pounds.

In order to lessen the burden of the individual removing spent filter cartridges from the drycleaning filtering tanks, filter cartridges have been produced which are half as long as the more conventionally-sized filter cartridges. However, this modification has not proved entirely satisfactory due to the facts that each half-size cartridge requires nearly the same labor costs to produce, two half-size cartridges do not produce the same effective filtering area as one conventional cartridge due to the increased number of sealed end face cap abutments of the half-sized cartridges, and the half-sized cartridges require twice as many metal end face caps as conventionally-sized filter cartridges, and twice as many felt seals for any given filtering tank length, thus increasing production and set-up costs.

According to the present invention, a dry cleaning filter cartridge is produced which is of conventional length and diameter, but which includes an outer cylindrical member which carries the outer pleated paper filter and a separate inner cylindrical member which carries the sorbant mass. Initially, the two members are held in concentric, axial allignment by inexpensive cardboard end cap seal rings adhesively bonded to at least one of the members; however, during use the dry cleaning solvent reacts with the adhesive to disengage the caps from the members and thus allow the separation of the members.

When spent, the entire filter cartridge, soaked with drycleaning solvent and laden with particulate and fibrous matter, may weigh in the order of 90 pounds; however, the inner member carrying the sorbant mass may, in a facile manner, be separated from and slid axially outwardly from the outer member, and thus be removed from the filter tanks separately from the outer member. Thereafter, the outer member may also be pulled from the filter tank separately. The inner member when removed from the filtering tank may weigh 50 pounds, while the outer member may weigh 40 pounds. Thus the total weight of the filter cartridge may be removed in two separate relatively easy operations.

Further, it has been found in use that the cardboard end cap seal rings act as excellent seals between abutting filter cartridges to prevent fluid from flowing between the end faces of adjacent filter cartridges and thereby bypassing the filters. The provision of the initially integral end cap seal rings allows the drycleaning operator to dispense with the conventional felt sealing rings utilized heretofore.

It is therefore the main object of the invention to provide a filter cartridge of the character described, including an annular, generally-cylindrical, outer member carrying a paper filter, and an annular, generally-cylindrical, inner member carrying a sorbant mass therewithin, and being coaxially disposed within the outer member; the inner member being removable from the outer member after the filter cartridge is spent to thereby allow the drycleaning establishment operator to remove two separate, relatively light members from the filtering tank instead of a single, relatively heavy unit.

It is another main object of the invention to provide a filter cartridge of the character described, including an end cap sealing ring adhesively bonded to each end face of the cartridge to prevent radial flow between adjacent cartridges.

BRIEF DESCRIPTION OF THE DRAWINGS

This, as well as other objects and advantages of the invention will become more apparent from a reading of the following detailed description of the preferred embodiment in conjunction with the drawings, wherein:

FIG. 1 is an isometric exploded view of a filter cartridge produced according to the present invention;

FIG. 2 is a side elevational view of the filter cartridge;

FIG. 3 is an end elevational view of the filter cartridge;

FIG. 4 is an end elevational view of the filter cartridge with the end sealing ring removed;

FIG. 5 is a cross-section of the filter cartridge taken along line 5—5 of FIG. 2 except with one end sealing ring removed; and FIG. 6 is a cross-section of the filter cartridge taken along line 6—6 of FIG. 5.

DETAILED DESCRIPTION OF THE PREFERRED EMBODIMENT

Referring now to the drawings wherein like reference characters designate like or corresponding parts throughout the several views, there is shown in FIG. 1, an exploded view of a filter cartridge 10 constructed in accordance with the principles of the present invention. As best seen in FIGS. 1 and 5, filter cartridge 10 includes an outer cylindrical member 12 having a tubular sheet metal support member 14 with perforations 16 therethrough along the entire surface thereof. (Only a small portion of perforations 16 are shown.) Attached, as by welding, to both ends of support member 14 there are annular flange members 18 and 20, each extending radially outwardly of support member 14 and each including an axial annular flange 18a and 20a respectively which are directed axially toward each other, and which act to hold an outer cylindrical pleated paper filter 22, (see FIG. 6), around the outer surface of support member 14. Paper filter 22 is also adhesively held onto flange members 18 and 20.

Filter cartridge 10 also includes a separate inner cylindrical member 24 fabricated of an inner perforated sheet metal tubular member 26 and a concentric outer perforated tubular sheet metal member 28 held in coaxial relationship by means of a pair of annular ring members 30 and 32. Both members 26 and 28 are perforated along the entire surface thereof although only a small portion of the perforations are shown in the drawings. Ring members 30 and 32 include axial annular flanges 30a and 32a respectively, attached as by spot welding to the outer end surfaces of inner tubular member 26 and annular flanges 30b and 32b respectively, attached to the inner end surfaces of outer tubular member 28. Formed between flanges 30a and 30b of ring member 30 is a radially disposed body portion 30c which is located in the same plane as the radially outwardly directed portion of flange 18 as well as the extremeties of sheet metal tubes 14,28 and 26. Likewise, ring member 32 includes a radially disposed body portion 32c located in the same plane with the radially outwardly extending portion of flange 20 and the opposite extremeties of tubes 14,26 and 28. The annular chamber 34 defined by inner and outer tubular members 26 and 28 respectively, and by ring members 30 and 32, is filled with a sorbant mass 48 comprised of a mixture of attapulgite clay and carbon particles. A typical analysis of the sorbant mass particles is contained in U.S. Pat. No. 3,733,267 referred to hereinabove.

One of the end rings 30 is provided with a slightly indented portion 38 into which is mounted a pivoted handle member 40 which initially is positioned within indented portion 38 but which may be pivoted outward as shown in FIG. 5 for reasons which will be explained hereinafter.

As shown in FIG. 5, outer tubular member 28 of inner cylindrical member 24 has an outside diameter slightly less than the inside diameter of support tube 14 of outer cylindrical member 12. Therefore, inner cylindrical member 24 fits snugly within inner cylindrical member 14 but due to the separate construction thereof, is capable of being slid axially outward of outer cylindrical member 14 as will be explained in greater detail hereinafter.

Initially, inner cylindrical member 24 is held inside and prevented from axial movement with respect to outer cylindrical member 12 by means of a pair of cardboard end cap seal rings 42 and 44 as shown in FIGS. 1 and 2. End cap seal rings 42 and 44 are each circular and of a diameter slightly less than the outside diameter of outer cylindrical member 12 and each includes a central hole 42a and 44a respectively, which are sized and positioned to correspond with the internal bore formed by inner tube member 26 of inner cylindrical member 24. Ring member 42 is held onto the end face of inner and outer cylindrical members 24 and 12 respectively by means of rings of adhesive 46 and 46a (FIG.1) positioned upon the end face 30c (FIG. 5) of ring member 30 and on the corresponding end face 18b of flange 18. Likewise, sealing ring member 44 is initially secured to the other end face of inner and outer cylindrical members 24 and 12 respectively by means of rings of adhesive (not shown) placed upon the outer end face 32c of ring member 32 and face 20b of flange 20. It is important to note that the adhesive utilized in attaching the sealing ring members 42 and 44 to inner and outer cylindrical members 24 and 12 respectively is one which will hold the cardboard to the sheet metal members during shipment and installation of the filter element into a filter tank; but which, during use, is attacked by the drycleaning fluid flowing through the filter tanks thereby losing its adhesive qualities. Cardboard sealing ring members 42 and 44 thus are released from the metal end faces by the adhesive, but are held in place by the compressive forces of abutting filter cartridges; however, when the filter cartridge is spent and ready to be removed from the filter tank, the cardboard sealing ring members 42 and 44 may be removed in a facile manner. Thereafter access to handle member 40 may be accomplished. Further, the fact that the cardboard end sealing rings 42 and 44 are initially adhesively bonded to the metal end faces of the filter cartridge allows for easy installation of the filter cartridges and attached seal rings into the filter tanks and provides immediate and reliable sealing between abutting filter cartridges to prevent radial flow between adjacent cartridges. One adhesive found satisfactory for this purpose is thermoplastic adhesive or hot melt such as #446 ESP Polyshot adhesive, available from the Speicer Morgan Company of St. Louis, Mo.

In operation filter cartridge 10, having inner cylindrical member 24 captively retained within outer cylindrical member 12 by means of sealing rings 42 and 44, is inserted into a filtering tank along with a number of other identical filter cartridges placed end-to-end in abutting and sealing relationship. Drycleaning fluid is circulated along the outside of the filter cartridges and through pleated paper filter element 22, perforated support 14, perforated tubular member 28, the sorbant mass 48 and thence through inner tubular member 26; wherein it is exhausted from the filtering tank through the elongated bore formed by the adjacently located inner tubular members 28 of abutting filter cartridges. During use the drycleaning fluid attacks the adhesive 46 and 46a to thereby destroy the bonding properties of the adhesive. Sealing ring member 42 and 44 will continue to remain in position due to the compressive forces generated by the abutting filter cartridges. However, when the filter cartridges are spent, the filter tank is opened and the drycleaning establishment proprietor may easily remove the sealing ring 42 to thereby reveal handle member 40. The proprietor may then swivel handle member 40 outwardly, and in a facile manner pull inner cylindrical member 24 axially outwardly of outer cylindrical member 12. Thereafter the proprietor may in a separate step slide outer cylindrical member 12 from the filter tank. This process is repeated until all of the filter elements are removed from the tank.

It can therefore by seen that the filter element 10, constructed in accordance with the principles of the invention, provides a filter cartridge which fulfills the objects of the invention as set forth hereinabove in that the drycleaning establishment operator may remove the relatively heavy spent filter element in two separate, relatively easy steps. Also, the provision of end cap sealing rings 42 and 44 initially held to the metal end faces of the filter cartridge allows for simple and easy installation and reliable sealing between abutting filter cartridges within the filter tank.

Inasmuch as numerous changes may be made to the preferred embodiment without departing from the spirit and scope thereof, it is requested that the invention be determined solely by the following claims.

I claim:

1. A filter cartridge comprising:
    an annular, generally cylindrical outer member including a paper filter;
    an annular, generally cylindrical inner member carrying a sorbant mass therewithin, and being coaxially disposed within said outer member;
    said inner member being removable from said outer member along the common longitudinal axis of said members;
    retaining means for initially retaining said inner member within said outer member;
    said retaining means being a circular disc releasably affixed to each end face of said outer member;
    said circular discs being fabricated of cardboard and being adhesively affixed to said outer member with a substance which deteriorates when exposed to drycleaning fluid to thereby release said discs from said outer member during use of said filter cartridge in filtering drycleaning fluid; and
    a central hole in each of said discs coincident with the longitudinal passage through said inner annular member.

2. A filter cartridge as specified in claim 1 wherein:
    said substance is an adhesive known as #446 ESP Polyshot Adhesive.

3. A filter cartridge as specified in claim 1 and further characterized by:
    said outer member including a generally cylindrical perforated, outer paper support cylinder and an annular outer end cap ring secured to and extending outwardly from each end of said paper support cylinder.

4. A filter cartridge comprising:
    an annular, generally clylindrical outer member including a paper filter;
    an annular generally cylindrical inner member carrying a sorbant mass therewithin, and being coaxially disposed within said outer member;
    said inner member being removable from said outer member along the common longitudinal axis of said members;
    said inner member including generally cylindrical, perforated inner and outer sorbant can cylinders, an inner end cap ring between said inner and outer sorbant can cylinders holding said sorbant can cylinders in concentric allignment;
    a sorbant mass carried within said inner and outer can cylinders and said inner end cap rings; and
    a handle on one end of said inner member for axially withdrawing said inner member from within said outer member.

* * * * *